United States Patent
Ezell et al.

(10) Patent No.: US 8,032,487 B1
(45) Date of Patent: Oct. 4, 2011

(54) SYSTEM AND METHOD FOR SYNCHRONIZING DATA IN A NETWORKED SYSTEM

(75) Inventors: John Ezell, Austell, GA (US); Neil Gilmartin, Atlanta, GA (US); Stephen Fitzpatrick, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2611 days.

(21) Appl. No.: 10/696,914

(22) Filed: Oct. 29, 2003

(51) Int. Cl.
*G06F 7/00* (2006.01)
*G06F 17/00* (2006.01)

(52) U.S. Cl. .......... 707/610; 707/690; 707/697

(58) Field of Classification Search .......... 707/201, 707/101, 610, 690, 697; 714/5
See application file for complete search history.

(56) References Cited

U.S. PATENT DOCUMENTS

| | | | | |
|---|---|---|---|---|
| 5,819,020 A * | 10/1998 | Beeler, Jr. | ............ | 714/5.11 |
| 5,874,563 A * | 2/1999 | Kim et al. | ............ | 536/23.72 |
| 5,974,563 A * | 10/1999 | Beeler, Jr. | ............ | 714/5 |
| 5,999,937 A * | 12/1999 | Ellard | ............ | 707/101 |
| 6,581,074 B1 * | 6/2003 | Wong et al. | ............ | 1/1 |
| 6,735,311 B1 * | 5/2004 | Rump et al. | ............ | 380/231 |
| 7,127,477 B2 * | 10/2006 | Duncombe et al. | ............ | 709/238 |
| 2003/0120685 A1 * | 6/2003 | Duncombe et al. | ............ | 707/200 |
| 2004/0083245 A1 * | 4/2004 | Beeler, Jr. | ............ | 707/204 |
| 2004/0205582 A1 * | 10/2004 | Schiller et al. | ............ | 715/513 |

* cited by examiner

*Primary Examiner* — Mohammad Ali
*Assistant Examiner* — Patrick A Darno
(74) *Attorney, Agent, or Firm* — Cantor Colburn LLP

(57) ABSTRACT

A system and method for synchronizing data in first and second computer servers is provided. The first computer server includes a first plurality of data sets each having a first identifier and a first set of attributes. The second computer server includes second plurality of data sets each having a second identifier and a second set of attributes. The method includes transmitting a second identifier and a second checksum value both associated with one of the second plurality of data sets to the first computer server. The method further includes accessing one of the first plurality of data sets having a first identifier corresponding to the transmitted second identifier to determine a first checksum value associated with the accessed data set. Finally, the method includes transmitting the one of the first plurality of data sets from the first computer server to the second computer server to replace a second set of attributes of the one of the second plurality of data sets with the first set of attributes of the one of the first plurality of data sets.

12 Claims, 3 Drawing Sheets

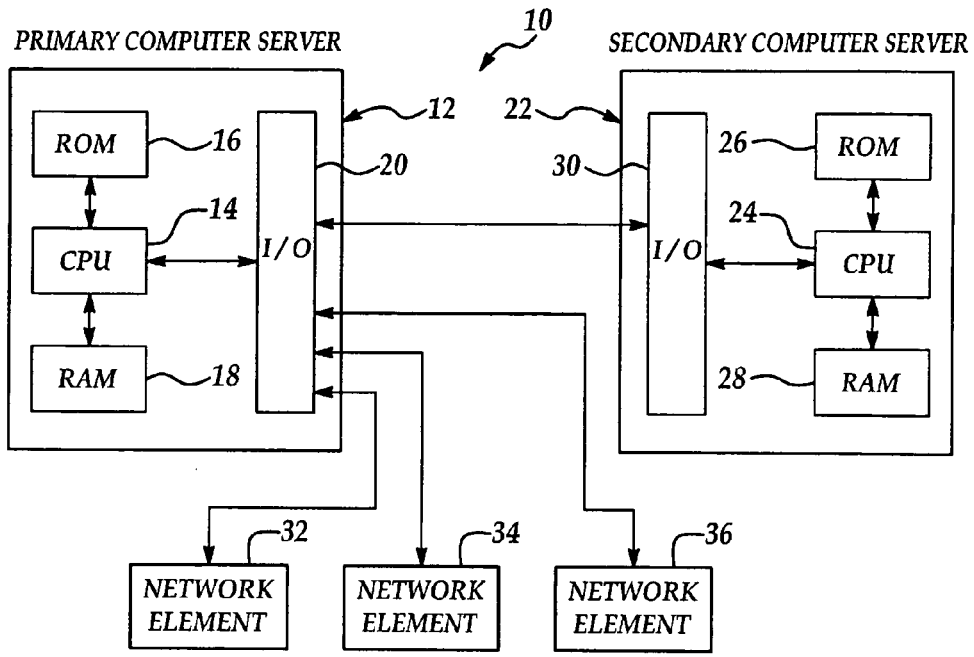

SYSTEM AND METHOD FOR SYNCHRONIZING DATA IN A NETWORKED SYSTEM

FIELD OF INVENTION

The invention relates to a system and method for synchronizing data in a first computer server and a second computer server in a networked system.

BACKGROUND OF INVENTION

Networked systems generally utilize numerous computer servers that communicate with one another. Further, known networked systems have utilized redundant copies of data sets or databases to allow easy access thereto at multiple physical locations. Generally, a primary computer server will have a primary or "master" plurality of data sets which contains the most "up to date" data sets. For purposes of discussion, a data set is a logically grouped set of software attributes associated with an entity that can be electronically stored in a computer memory. An entity may comprise, for example, one of the following: a communication network element, data, a software event, or a logical operator. A secondary computer server often will have a redundant copy of the primary data set or a copy of a portion of the primary data set, which is called a secondary data set.

When supporting the known networked system it is necessary to synchronize the primary plurality of data sets and the secondary plurality of data sets to ensure that particular attributes stored in the predetermined data sets match one another. To accomplish this system synchronization task, known methods transmit the entire plurality of primary data sets from the first computer server to the secondary computer server to compare and update the secondary plurality of data sets, or vice versa. Accordingly, during this system-synchronization task, the transmission of a relatively large number of data sets, each having a relatively large number of attributes, between the servers in a networked system adversely affects concurrent transmission of other data because most of the system communication bandwidth is being utilized to synchronize the data sets.

Accordingly, there is a need for a system and method for performing data synchronization in a networked system that reduces the amount of information transmitted between the primary and secondary computer servers.

SUMMARY OF INVENTION

The foregoing problems and disadvantages are overcome by a system and method for synchronizing data in a first computer server and a second computer server in accordance with the exemplary embodiments disclosed herein.

A method for synchronizing data in first and second computer servers in accordance with exemplary embodiments is provided. The first computer server includes a first plurality of data sets each having a first identifier and a first set of attributes. The second computer server includes a second plurality of data sets each having a second identifier and a second set of attributes. The method includes transmitting a second identifier and a second checksum value both associated with one of the second plurality of data sets to the first computer server. The method further includes accessing one of the first plurality of data sets having a first identifier corresponding to the transmitted second identifier to determine a first checksum value associated with the accessed data set. Finally, the method includes transmitting the one of the first plurality of data sets from the first computer server to the second computer server to replace a second set of attributes of the one of the second plurality of data sets with the first set of attributes of the one of the first plurality of data sets when the first checksum value is not equal to the transmitted second checksum value.

A networked system in accordance with exemplary embodiments utilizes a first computer server and a second computer server operably communicating with one another. The first computer server is configured to store a first plurality of data sets each having a first identifier and a first set of attributes. The second computer server is configured to store a second plurality of data sets each having a second identifier and a second set of attributes. The second computer server is further configured to transmit a second identifier and a second checksum value both associated with one of the second plurality of data sets to the first computer server. The first computer server is further configured to access one of the first plurality of data sets having a first identifier that corresponds to the transmitted second identifier to determine a first checksum value associated with the accessed data set. The first computer server is further configured to transmit the one of the first plurality of data sets from the first computer server to the second computer server to replace a second set of attributes of the one of the second plurality of data sets with the first set of attributes of the one of the first plurality of data sets when the first checksum value is not equal to the transmitted second checksum value.

Other systems, methods and/or computer program products according to the embodiments will be or become apparent to one with skill in the art upon review of the following drawings and detailed description. It is intended that at all such additional systems, methods, and/or computer program products be within the scope of the present invention, and be protected by the accompanying claims.

BRIEF DESCRIPTION DRAWINGS

FIG. 1 is a block diagram of a networked system having a primary computer server and a secondary computer server.

FIG. 2 illustrates an exemplary data set in a primary computer server and an exemplary data set in a secondary computer server.

DESCRIPTION OF AN EMBODIMENT

Figure 3A:
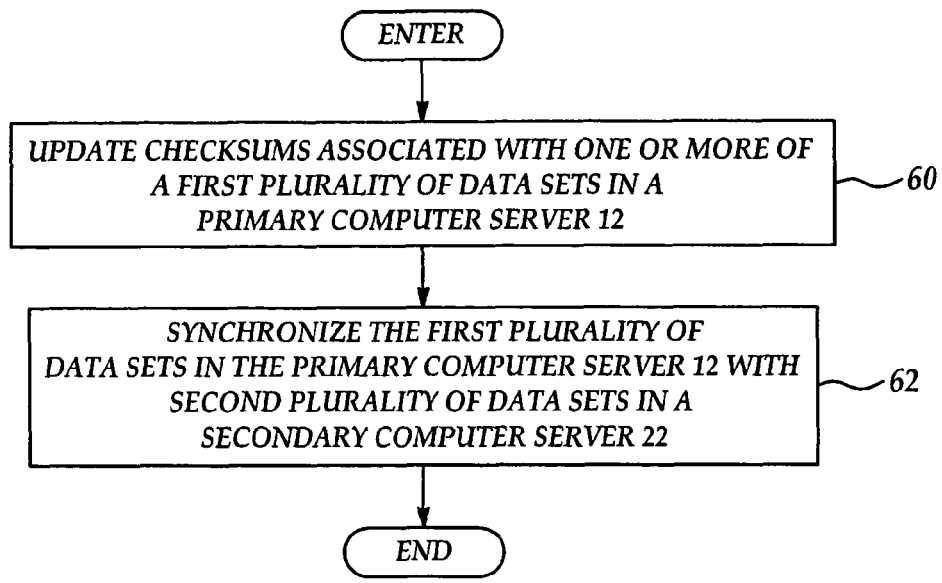
FIGS. 3A-3C illustrate a flowchart of a method for synchronizing data in first and second computer servers.

Referring to the drawings, identical reference numerals represent identical components in the various views. Referring to FIG. 1, networked system 10 includes a primary computer server 12 and a secondary computer server 22. As will be discussed in greater detail below, system 10 and a method related thereto can synchronize data sets in computer servers 12, 22 while decreasing the amount of information exchanged between the servers.

Networked system 10 can be any type of known network including, but not limited to, a public switched telephone network (PSTN), a wide area network (WAN), a local area network (LAN), a global network (e.g. Internet), a voice over Internet protocol (VOIP) network, a virtual private network (VPN), and an intranet. Networked system 10, maybe implemented using a wireless network or any kind of physical communication network known to those skilled in the art.

Primary computer server 12 is provided to communicate with secondary computer server 22 and network elements 32, 34, 36. Computer server 12 is further provided to store a "master" data set that contains the most up-to-date data utilized in system 10. Server 12 includes a microprocessor 14 communicating with various computer readable storage medium. The computer readable storage media preferably includes nonvolatile and volatile storage in a read-only memory (ROM) 16 and a random access memory (RAM) 18. The computer readable medium may be implemented using any of a number of known memory devices such as PROMs, EPROMs, EEPROMS, flash memory or any other electric, magnetic, optical or combination memory device capable of storing data, some of which represent executable instructions used by microprocessor 14. Microprocessor 14 may communicate with various servers and network elements via an input/output (I/O) interface 20.

Secondary computer server 22 is provided to communicate with primary computer server 12 and to store a copy of the entire "master" plurality of data sets or a portion of the "master" plurality of data sets stored in server 12. Server 22 may also be utilized to perform diagnostic analysis of the network 10 using the data set stored in server 22. Server 22 includes a microprocessor 24, ROM 26, RAM 28, and I/O interface 30. As illustrated in FIG. 1, I/O interface 30 of server 22 may be connected to I/O interface 20 of server 12 for communication therebetween. Further, network elements 32, 34, 36 maybe connected to I/O interface 20 and server 12 for communication therebetween. It should be noted that each of computer servers 12, 22 could be implemented using a multi-processor server architecture.

Network elements 32, 34, 36 may comprise any device that can communicate over network 10. For example, network elements 32, 34, 36 may comprise multiplexer units (having physical racks, shelves, communication cards, microprocessors, and communication ports) that communicate with other servers or other network elements (not shown).

Referring to FIG. 2, the plurality of data sets used in primary computer server 12 and secondary computer server 22 will be explained. Blocks 42, 44 correspond to a plurality of data sets stored in the memory of computer server 12, hereinafter referred to as the "first plurality of data sets". Block 46 corresponds a plurality of data sets stored in the memory of computer server 22, hereinafter referred to as the "second plurality of data sets". Block 48 corresponds to intermediate calculations performed in computer server 12 to calculate a checksum associated with a particular identifier which will be explained in greater detail below.

Before engaging in a detailed discussion for synchronizing data between the first and second plurality of data sets in computer servers 12, 22, respectively, a general overview will be provided. In order to synchronize data between the first and second plurality of data sets in computer servers 12, 22, the servers will utilize: (i) a predetermined entity identifier for each related data set in computer servers 12, 22 that can be recognized by both servers, (ii) each data set will have a set of attributes (e.g., fields of data) of common interest and a corresponding checksum associated with the attributes, and (iii) the entity identifier and each attribute of each data set will have a predetermined format type when transmitting the data set from computer server 12 to computer server 22.

Referring again to blocks 42, 44, the first plurality of data sets may be partitioned into two or more memory locations in memory. Further, each of the first plurality of data sets has an entity identifier (e.g., E1) and attributes (e.g., a, d, checksum1, f, b, c) associated with the identifier. Each entity identifier identifies one data set in a computer server and further corresponds to a predetermined entity. As discussed above, an entity may comprise, for example, one of the following: a communication network element, data, a software event, or a logical operator. Further, each entity identifier has an associated checksum value based on a checksum calculation performed on one or more of attributes associated with the entity identifier. For example, entity identifier (E1) may include an attribute (checksum1) corresponding to a checksum value calculated using attributes (a, c) of entity (E1). Further, attributes associated with an entity identifier may have a data format types different from one another. For example, entity identifier (E1) has attributes (a, d, checksum1) having format types of (B1, B2, Y3), respectively.

Referring to block 46, each data set of the second plurality of data sets also includes an entity identifier (e.g., E1) and attributes (e.g., a, c, checksum1) associated with the identifier. Further, each entity identifier has a checksum value based on a checksum calculations performed on one or more of attributes associated with the entity identifier. For example, entity identifier (E1) includes an attribute (checksum1) corresponding to a checksum value calculated using attributes (a, c) of entity (E1) in block 46. Further, attributes associated with an entity identifier may have a predetermined data format types different from one other. For example, entity identifier (E1) of block 46 has attributes (a, c, checksum1) having format types of (A1, A2, Y3), respectively.

Referring to block 48, this block represents a temporary data buffer in RAM 18 of computer server 12 for formatting attributes of data sets to predetermined format types for: (i) transmitting data sets between computer servers 12, 22, and (ii) calculating checksum values associated with predetermined data sets that are subsequently stored in the memory of server 12. For example, data buffer 48 can be used for converting attributes (a, c) of entity (E1) in block 42 from format types (B1, B3) to format types (Y1, Y2) to calculate the (checksum1) value based on attributes (a, c). The contents of data buffer 48 can be transmitted to computer server 22 or copied to data blocks 42, 44 of computer server 12. Although one data buffer 48 is shown for a computer server 12, it should be noted that computer server 22 also utilizes a similar temporary data buffer for converting attributes of data sets to predetermined formats and for calculating checksum values.

Figure 3B:
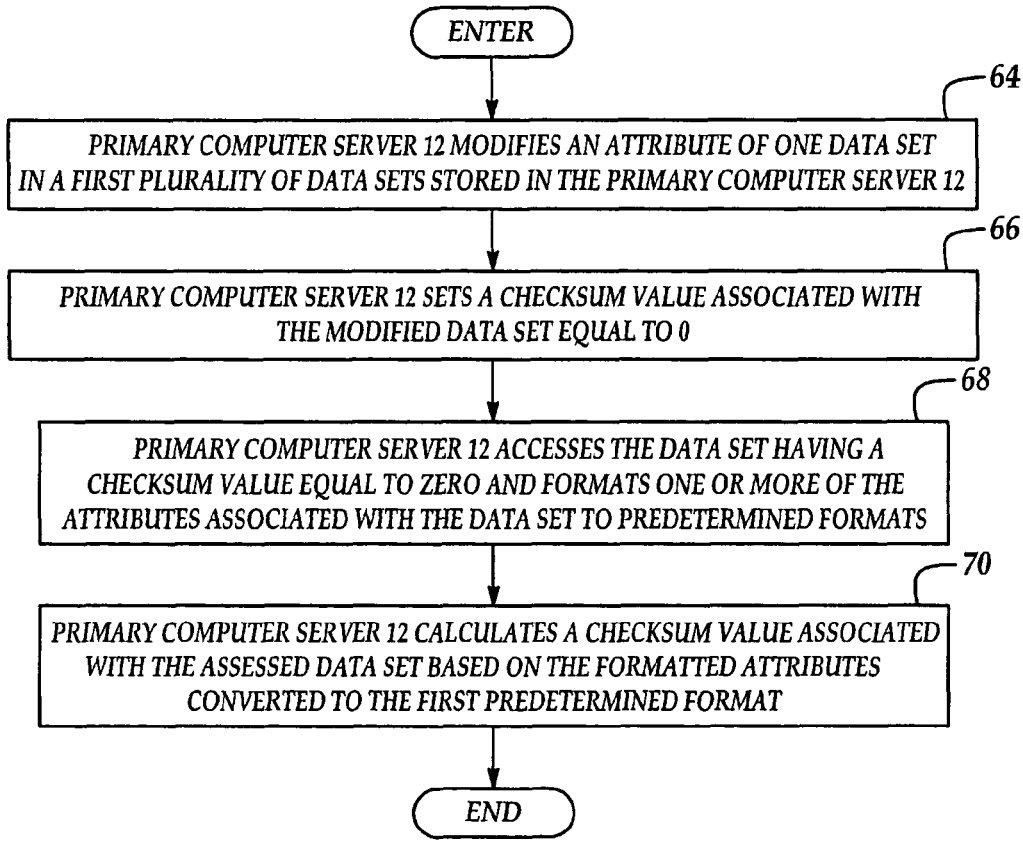
Figure 3C:
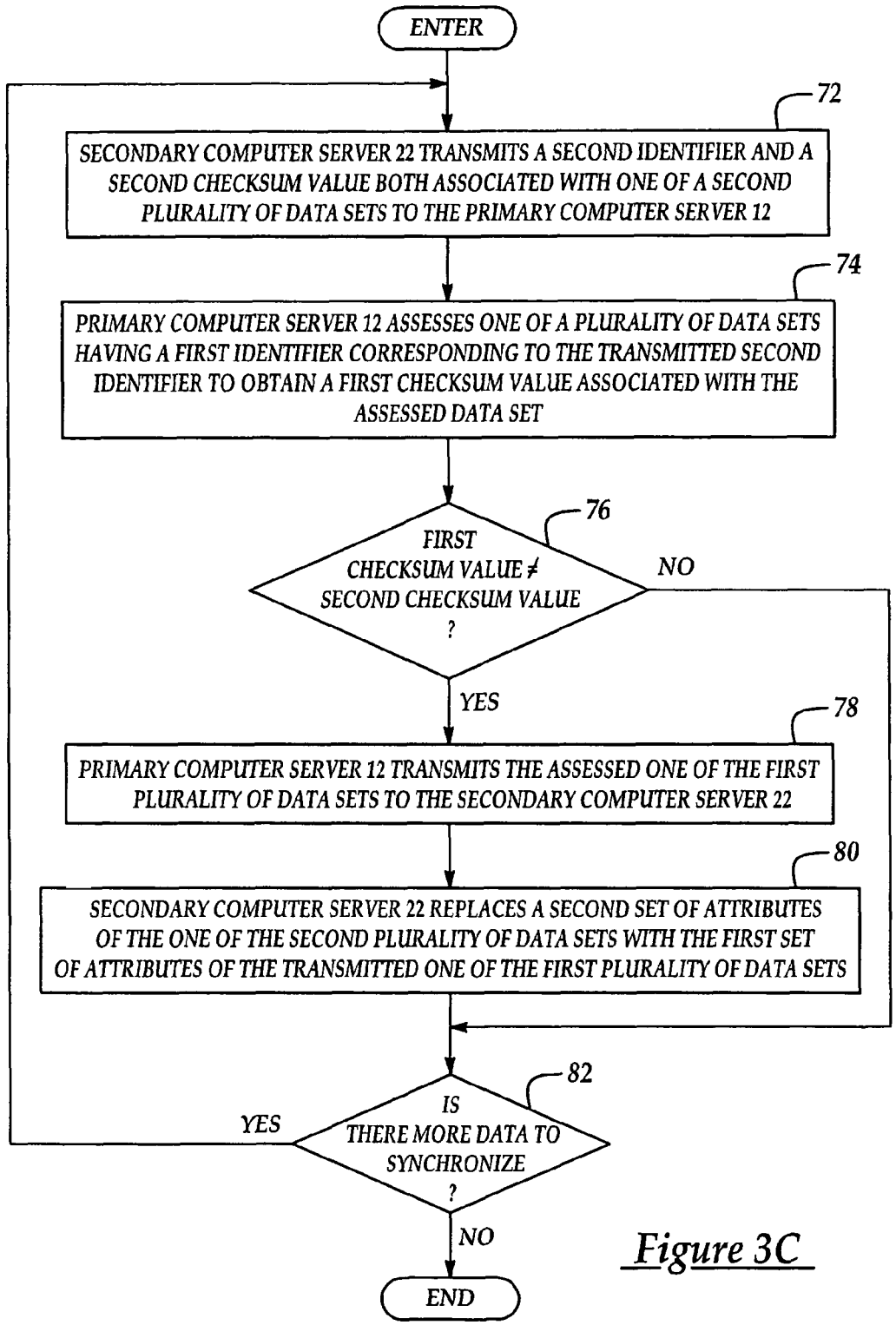

Referring to FIGS. 3A-3C, a method for synchronizing the first plurality of data sets and the second plurality of data sets in computer servers 12, 22, respectively, will now be explained. For purposes of simplicity, the method will be explained assuming one data set identified by entity identifier (E1) in blocks 42, 44 of computer server 12 will be used to synchronize a related data set identified by identifier (E1) in block 46 of computer server 22. Further, it will be assumed that only the common attributes (a, c) of entity identifiers (E1) will be synchronized.

At step 60, primary computer server 12 updates one or more checksum values associated with the first plurality of data sets of blocks 42, 44. To implement step 60, steps 64-70 will be performed. At step 64, computer server 12 modifies an attribute of one data set of the first plurality of data sets stored in server 12. For example, referring to FIG. 2, computer server 12 may modify attributes (a, c) of entity identifier (E1) of blocks 42, 44. Thus, at this time the attributes (a, c) of entity identifier (E1) in blocks 42, 44 will not be synchronized or match attributes (a, c) of entity identifier (E1) in block 46 of computer server 22.

Next at step 66, computer server 12 sets a checksum value associated with the modified data set equal to zero. For example, computer server 12 can set the (checksum1) value of entity identifier (E1) of block 42 equal to zero.

Next at step 68, computer server 12 accesses the data set having a checksum value equal to zero and formats one or more of the attributes associated with the data set to predetermined formats types. For example, computer server 12 can access entity identifier (E1) of block 42 having a (checksum1) value equal to zero. Thereafter, referring to block 48, computer server 12 can convert attributes (a, c) associated with entity identifier (E1) to data formats (Y1, Y2).

Next at step 70, computer server 12 calculates a checksum value associated with the accessed data set based on the formatted attributes. For example, computer server 12 can calculate a new (checksum1) value in block 48 based on the attributes (a, c) having data formats (Y1, Y2). Thereafter, the updated attributes (a, c) and new (checksum1) of the identifier (E1) can be stored in the memory of computer server 12.

Referring to FIGS. 2, 3A, 3C, after step 60 the method advances to step 62. At step 62, one or more of the second plurality of data sets in the secondary computer server 22 is synchronized with one or more of the first plurality of data sets in the primary computer server 12. To implement step 62, steps 72-80 are performed.

At step 72, secondary computer server 22 transmits a second entity identifier and a second checksum value both associated with one of the second plurality of data sets to the computer server 12. For example, computer server 22 can transfer identifier (E1) and (checksum1) of block 46 to computer server 12.

Next at step 74, computer server 12 accesses one of a plurality of data sets having a first identifier corresponding to the transmitted second identifier to obtain a first checksum value associated with the accessed data set. For example, computer server 12 can utilize a received entity identifier (E1) from computer server 22 to access the data set identified by entity identifier (E1) of block 42 to obtain the associated (checksum1) value.

Next at step 76, computer server 12 makes a determination as to whether the (checksum1) value of block 42 is not equal to the received (checksum1) value of block 46. If the value of step 76 is true, indicating that the two data sets are not synchronized, the method advances to step 78. Otherwise, the method advances to step 82.

At step 78, computer server 12 transmits the accessed one of the first plurality of data sets to secondary computer server 22. For example, computer server 12 can convert attributes (a, c) of entity identifier (E1) of block 42 from format types (B1, B3) to format types (Y1, Y2) in block 48 and then transfer the entity identifier (E1) and formatted attributes (a, c) to computer server 22.

Next at step 80, computer server 22 replaces a second set of attributes of the one of the second plurality of data sets with the first set of attributes of the transmitted one of the first plurality of data sets. For example, computer server 22 can replace the attributes (a, c) of entity identifier (E1) of block 46 with updated attributes (a, c) of entity identifier (E1) from blocks 42, 44.

Next, at step 82, computer server 12 determines whether there is more data to synchronize in computer servers 12, 22. If the value of step 82 equals "yes", the method advances to step 72. Otherwise, the method is ended.

Although the inventive method was explained by synchronizing one data set in each of computer servers 12, 22, it should be understood that the method could be iteratively performed to synchronize a plurality of data sets in computer server 12 with a plurality of data sets in computer server 24.

As discussed above, embodiments for synchronizing data information in first and second computer servers in a networked system provide substantial advantages over known systems. In particular, the embodiments only transmit an entity identifier and a checksum value and associated with a data set from a first server to a server to determine whether the data sets are synchronized, instead of transmitting the entire data set from the first computer server to the second computer server. Thus, the embodiments substantially reduce the amount of information that is transmitted through the networked system during synchronization of the data sets in each of the computer servers.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

We claim:

1. A method for synchronizing data in first and second computer servers, the first computer server including a first plurality of data sets each having a first identifier and a first set of attributes, and the second computer server including a second plurality of data sets each having a second identifier and a second set of attributes, the method comprising:
    modifying an attribute of one of the first plurality of data sets and setting a checksum associated with one of the first plurality of data sets to a predetermined value;
    accessing one of the first plurality of data sets having a checksum set to the predetermined value and formatting at least one attribute associated with the one of the first plurality of data sets to a predetermined format type;
    transmitting a second identifier and a second checksum value both associated with one of the second plurality of data sets to the first computer server;
    accessing one of the first plurality of data sets having a first identifier corresponding to the transmitted second identifier to determine a first checksum value associated with the accessed data set; and,
    when the first checksum value is not equal to the transmitted second checksum value, transmitting the one of the first plurality of data sets from the first computer server to the second computer server to replace a second set of attributes of the one of the second plurality of data sets with the first set of attributes of the one of the first plurality of data sets.

2. The method of claim 1 wherein the one of the first plurality of data sets includes the first set of attributes associated with one of a physical network element, a software event, and a logical operator.

3. The method of claim 1 wherein the first checksum value is calculated by the first computer server using the first set of attributes associated with the one of the first plurality of data sets.

4. The method of claim 1 further comprising transmitting the first checksum value to the second computer server to replace the second checksum value in the second computer server with the first checksum value.

5. The method of claim 1 wherein the one of the first plurality of data sets is formatted differently than the one of the second plurality of data sets.

6. The method of claim 1 wherein the first plurality of data sets includes at least one data set that does not correspond to any of the second plurality of data sets.

7. A networked system, comprising:

a first computer server and a second computer server operably communicating with one another, the first computer server configured to store a first plurality of data sets each having a first identifier and a first set of attributes, and the second computer server configured to store a second plurality of data sets each having a second identifier and a second set of attributes;

the first computer server further configured to modify an attribute of one of the first plurality of data sets and set a checksum associated with one of the first plurality of data sets to a predetermined value;

the first computer server further configured to access one of the first plurality of data sets having a checksum set to the predetermined value and format at least one attribute associated with the one of the first plurality of data sets to a predetermined format type;

the second computer server further configured to transmit a second identifier and a second checksum value both associated with one of the second plurality of data sets to the first computer server;

the first computer server further configured to access one of the first plurality of data sets having a first identifier that corresponds to the transmitted second identifier to determine a first checksum value associated with the accessed data set; and, the first computer server further configured to transmit the one of the first plurality of data sets from the first computer server to the second computer server to replace a second set of attributes of the one of the second plurality of data sets with the first set of attributes of the one of the first plurality of data sets when the first checksum value is not equal to the transmitted second checksum value.

8. The networked system of claim 7 wherein the one of the first plurality of data sets includes a first set of attributes associated with one of a physical network element, a software event, and a logical operator.

9. The networked system of claim 7 wherein the first checksum value is calculated by the first computer server using the a first set of attributes associated with the one of the first plurality of data sets.

10. The networked system of claim 7 wherein the first computer is further configured to transmit the first checksum value to the second computer server to replace the second checksum value in the second computer server with the first checksum value.

11. The networked system of claim 7 wherein the one of the first plurality of data sets is formatted differently than the one of the second plurality of data sets.

12. The networked system of claim 7 wherein the first plurality of data sets includes at least one data set that does not correspond to any of the second plurality of data sets.

* * * * *